(12) United States Patent
Kim

(10) Patent No.: US 10,171,542 B2
(45) Date of Patent: Jan. 1, 2019

(54) METHOD FOR PROVIDING CLOUD STREAMING SERVICE, DEVICE AND SYSTEM FOR SAME, AND COMPUTER-READABLE RECORDING MEDIUM HAVING, RECORDED THEREON, CLOUD STREAMING SCRIPT CODE FOR SAME

(71) Applicant: SK TechX Co., Ltd., Seoul (KR)

(72) Inventor: Taewon Kim, Seoul (KR)

(73) Assignee: SK TECHX CO., LTD., Seoul (KR)

( * ) Notice: Subject to any disclaimer, the term of this patent is extended or adjusted under 35 U.S.C. 154(b) by 0 days.

(21) Appl. No.: 15/314,090

(22) PCT Filed: Dec. 3, 2014

(86) PCT No.: PCT/KR2014/011749
§ 371 (c)(1),
(2) Date: Nov. 27, 2016

(87) PCT Pub. No.: WO2015/199293
PCT Pub. Date: Dec. 30, 2015

(65) Prior Publication Data
US 2017/0187777 A1     Jun. 29, 2017

(30) Foreign Application Priority Data

Jun. 25, 2014   (KR) .......................... 10-2014-0077925

(51) Int. Cl.
*H04L 29/06*      (2006.01)
*G06Q 50/10*      (2012.01)
(Continued)

(52) U.S. Cl.
CPC ........ *H04L 65/607* (2013.01); *G06F 9/45529* (2013.01); *G06Q 50/10* (2013.01);
(Continued)

(58) Field of Classification Search
CPC ....... H04L 65/607; H04L 67/02; H04L 67/10; H04L 67/141; H04L 67/1063;
(Continued)

(56) References Cited

U.S. PATENT DOCUMENTS

| | | | |
|---|---|---|---|
| 7,941,525 B1 * | 5/2011 | Yavilevich | G06Q 30/02 709/203 |
| 8,260,845 B1 * | 9/2012 | Colton | G06F 8/30 709/202 |

(Continued)

FOREIGN PATENT DOCUMENTS

| | | |
|---|---|---|
| KR | 10-2012-0072113 A | 7/2012 |
| KR | 10-2013-0066069 A | 6/2013 |

(Continued)

OTHER PUBLICATIONS

Sumbaly R, Kreps J, Shah S. The big data ecosystem at linkedin. InProceedings of the 2013 ACM SIGMOD International Conference on Management of Data Jun. 22, 2013 (pp. 1125-1134). ACM. (Year: 2013).*

(Continued)

*Primary Examiner* — Ranodhi Serrao
*Assistant Examiner* — James N Fiorillo
(74) *Attorney, Agent, or Firm* — Brinks Gilson & Lione

(57) ABSTRACT

The present invention relates to a method for providing a cloud streaming service, a device and a system for same, and a computer-readable recording medium having, recorded thereon, a cloud streaming script code for same. At the time of loading a webpage, the present invention loads the webpage with a predefined cloud streaming script code inserted therein and thus can perform processing such that the webpage can provide the could streaming service. Consequently, a pop-up window event or the like, which is incapable of providing the cloud streaming service, can (Continued)

easily be processed without any particular modification to an internal browser engine.

7 Claims, 7 Drawing Sheets

(51) Int. Cl.
*G06F 9/455* (2018.01)
*H04L 29/08* (2006.01)
(52) U.S. Cl.
CPC .......... *H04L 65/4084* (2013.01); *H04L 67/02* (2013.01); *H04L 67/10* (2013.01)
(58) Field of Classification Search
CPC .............. G06F 17/218; G06F 17/2247; G06F 17/30038; G06F 17/30873
USPC .............. 709/204, 217, 219, 224, 231, 203; 715/202, 204, 205, 234, 738, 753
See application file for complete search history.

(56) References Cited

U.S. PATENT DOCUMENTS

| | | | |
|---|---|---|---|
| 2004/0216042 A1* | 10/2004 | Consolatti | G06F 8/30 715/234 |
| 2005/0060180 A1* | 3/2005 | Wood | G06Q 30/02 715/733 |
| 2006/0075088 A1* | 4/2006 | Guo | H04L 67/02 709/224 |
| 2007/0180147 A1 | 8/2007 | Leigh | |
| 2007/0189708 A1* | 8/2007 | Lerman | G11B 27/034 386/280 |
| 2007/0234196 A1* | 10/2007 | Nicol | G06F 17/30038 715/205 |
| 2009/0157727 A1* | 6/2009 | Paila | H04H 40/27 |
| 2010/0306813 A1* | 12/2010 | Perry | A63F 13/10 725/114 |
| 2010/0332993 A1* | 12/2010 | Bousseton | G06Q 30/02 715/738 |
| 2013/0013671 A1 | 1/2013 | Relan et al. | |
| 2013/0219048 A1* | 8/2013 | Arvidsson | H04L 41/5025 709/224 |
| 2014/0019534 A1* | 1/2014 | Handrigan | G06F 17/30873 709/204 |
| 2014/0020017 A1* | 1/2014 | Stern | H04N 21/23611 725/34 |
| 2014/0072223 A1* | 3/2014 | Sallent Aspa | G06K 9/46 382/181 |
| 2014/0136944 A1 | 5/2014 | Harris et al. | |
| 2014/0149596 A1* | 5/2014 | Emerson, III | H04L 67/10 709/231 |
| 2014/0164563 A1* | 6/2014 | Leekley | H04L 67/1074 709/217 |
| 2014/0189498 A1* | 7/2014 | Liverant | G06Q 30/0277 715/234 |
| 2014/0244488 A1 | 8/2014 | Kim et al. | |
| 2014/0281850 A1* | 9/2014 | Prakash | G06F 17/218 715/202 |
| 2014/0298159 A1* | 10/2014 | Kim | G06F 17/2247 715/234 |
| 2014/0344806 A1* | 11/2014 | Suresh | G06F 9/45533 718/1 |
| 2015/0052196 A1* | 2/2015 | Emerson, III | H04L 67/10 709/203 |
| 2015/0135214 A1* | 5/2015 | Reisman | H04N 21/64322 725/37 |
| 2015/0149916 A1* | 5/2015 | Mendez | G06F 17/30873 715/738 |
| 2015/0244814 A1* | 8/2015 | Khalatian | H04L 67/141 715/753 |
| 2015/0310126 A1* | 10/2015 | Steiner | G06F 17/2247 715/204 |
| 2015/0370454 A1* | 12/2015 | Nordstrom | G06F 3/0481 715/728 |
| 2015/0373081 A1* | 12/2015 | Laga | H04L 51/046 709/203 |

FOREIGN PATENT DOCUMENTS

| | | |
|---|---|---|
| KR | 10-2014-0022254 A | 2/2014 |
| KR | 10-2014-0051359 A | 4/2014 |
| KR | 10-2014-0076069 A | 6/2014 |

OTHER PUBLICATIONS

International Search Report dated Mar. 25, 2015 corresponding to International Application No. PCT/KR2014/011749.
Extended European Search Report dated Nov. 9, 2017, from European Patent Office in connection with the counterpart European Patent Application No. 14895905.9.

* cited by examiner

FIG. 7

```
void jsInjection(CefRefPtr<CefBrowser> browser, CefRefPtr<CefDOMDocument> document){
  //Check whether Java script code has been already inserted
  if(isInjectedJs(document))
    return;

//Check location of Java script code file
  String jsFilePath = getJsFilePath();
  if(jsFilePath.empty())
    return;

//Execute Java script code file
  CefRefPtr<CefFrame> frame = browser->GetMainFrame();
  frame->ExecuteJavaScript(jsFilePath, frame->GetURL(), 0);
}
```

FIG. 8

```
window.alert = function(m){console.log(m);} var orgOpen=window.open;
window.open=function(u, w, wi) {
        return orgOpen(u, '_self', wi);
}
```

METHOD FOR PROVIDING CLOUD STREAMING SERVICE, DEVICE AND SYSTEM FOR SAME, AND COMPUTER-READABLE RECORDING MEDIUM HAVING, RECORDED THEREON, CLOUD STREAMING SCRIPT CODE FOR SAME

CROSS REFERENCE TO RELATED APPLICATION

This application claims the priority of Korean Patent Application No. 10-2014-0077925, filed on Jun. 25, 2014 in the KIPO (Korean Intellectual Property Office). Further, this application is the National Phase application of International Application No. PCT/KR2014/011749 filed Dec. 3, 2014, which designates the United States and was published in Korean.

TECHNICAL FIELD

The present invention relates to a cloud streaming service and, particularly, to a method for providing a cloud streaming service to process a web page to be adapted for the cloud streaming service by inserting a predefined script code for cloud streaming into the web page to be loaded, a device and system for the method, and a computer-readable recording medium having, recorded thereon, a cloud streaming script code for the method.

BACKGROUND

With the development of computer network technologies, a traditional computing environment depending on independent hardware performance of each terminal is now evolving into a cloud computing system that provides a service, requested by the terminal, through the utilization of all computing resources on a network.

The cloud computing may be defined as 'on-demand outsourcing service of computing resources' through an information communication network such as Internet. In the cloud computing environment, a service provider provides necessary services to users by integrating data centers, deployed at several places, by means of virtualization technology. A user can select and use a desired service in a virtual space created through virtualization technology at any time rather than using computing resources, such as applications, storage, operating system (OS), security, etc., installed in his or her own terminal. Namely, the cloud computing is a computing service that allows a user to rent and use hardware/software computing resources, distributed like cloud, and to pay a usage fee. Thus, the cloud computing refers to technology for integrating and providing computing resources existing at physically different locations by means of virtualization technology.

Using such cloud computing, a user can access the cloud network through his or her terminal that performs only a network access and basic functions, can perform a task that requires high-volume storage and high-performance computing resources, and can be provided with various services.

The cloud streaming service is a service based on this cloud computing environment. Specifically, the cloud streaming service executes contents such as web applications at a server by utilizing server resources, captures and encodes an execution screen as a GUI screen, and transmits it to the terminal in real time. Since the terminal performs only input and output functions, a user can use applications or contents requiring high-performance computing resources regardless of the capability of the terminal.

However, the cloud streaming service is not available for a separate window, such as an open of a new window or a display of a popup window, other than a main window during the operation of a browser. Although this issue needs to develop a new browser, this incurs considerable time and cost.

SUMMARY

The present invention suggested to solve the above problems has an object of providing a method for providing a cloud streaming service to process a web page to be adapted for the cloud streaming service by inserting a predefined script code for cloud streaming into the web page to be loaded, a device and system for the method, and a computer-readable recording medium having, recorded thereon, a cloud streaming script code for the method.

In order to achieve the above object, a cloud service device according to an embodiment of this invention may comprise a service communication unit configured to transmit and receive information to and from one or more terminals and a content providing device for providing a web page; a service storage unit configured to store a predefined script code for cloud streaming; and a service control unit configured to receive a request for the web page from a terminal through the service communication unit, to insert the predefined script code for cloud streaming into the web page provided from the content providing device, to create a capture image by capturing the web page having the inserted script code, to encode the capture image, and to transmit the encoded image to the terminal through the service communication unit.

In this case, the service control unit according to this invention may be further configured to find a Java script code region in the web page, to determine whether the predefined script code for cloud streaming is inserted in the found Java script code region, to identify an insertion location of the script code if no script code is inserted, and to insert the script code into the identified location.

Additionally, the service control unit according to this invention may be further configured, when creating the capture image by capturing the web page having the inserted script code, to execute the script code inserted in the web page, to redefine a designated object in the web page so as to display a designated message of the web page in a main window, and to create the capture image by capturing the web page.

Herein, the designated message according to this invention may be at least one of an alert message, a confirm message, and a prompt message.

Additionally, the service control unit according to this invention may be further configured, when the script code is executed, to redefine open method attribute information of a window object or attribute information of a link tag object, as self, in the web page.

Additionally, the service control unit according to this invention may be further configured to redefine the designated object in the web page such that the designated message of the web page is inserted in a corresponding location in the main window.

In order to achieve the above object, a cloud system according to an embodiment of this invention may comprise a cloud service device configured to receive, from a terminal, a request for a web page provided by a content providing device, to insert a predefined script code for cloud streaming into the web page provided from the content providing device, to create a capture image by capturing the web page having the inserted script code, to encode the capture image, and to transmit the encoded image to the terminal; and the terminal configured to send the request for the web page to the cloud service device, and to receive the encoded web page from the cloud service device.

In order to achieve the above object, a method for providing a cloud streaming service according to an embodiment of this invention may comprise steps of at a cloud service device, receiving, from a terminal, a request for a web page provided by a content providing device; at the cloud service device, inserting a predefined script code for cloud streaming into the web page provided from the content providing device; at the could service device, creating a capture image by capturing the web page having the inserted script code; and at the cloud service device, encoding the capture image and transmitting the encoded image to the terminal.

This method according to this invention may further comprising step of, after the step of receiving the request for the web page, at the cloud service device, receiving the web page by accessing the content providing device.

Additionally, the step of inserting the script code according to this invention may include steps of, at the cloud service device, finding a Java script code region in the web page; at the cloud service device, determining whether the predefined script code for cloud streaming is inserted in the found Java script code region; at the cloud service device, identifying an insertion location of the script code in the Java script code region if no script code is inserted; and at the cloud service device, inserting the script code into the identified location.

Additionally, the step of creating the capture image according to this invention may include steps of, at the cloud service device, executing the script code inserted in the web page; at the cloud service device, redefining a designated object in the web page so as to display a designated message of the web page in a main window; and at the cloud service device, creating the capture image by capturing a screen resulting from execution of the redefined web page.

Herein, the redefining step according to this invention may include step of, at the cloud service device, redefining open method attribute information of a window object or attribute information of a link tag object, as self, in the web page.

Additionally, the method according to this invention may further comprise steps of, after the step of transmitting the encoded image to the terminal, at the cloud service device, receiving an activation event for the designated message from the terminal, displaying the designated message in the main window according to the redefined object, creating a capture image by capturing a screen resulting from the displaying step, encoding the capture image, and offering the encoded image to the terminal.

Further, this invention may provide a computer-readable recording medium having, recorded thereon, a program executing the above-discussed method.

In order to achieve the above object, according to an embodiment of this invention, a computer-readable recording medium having, recorded thereon, a script code for cloud screaming, the script code comprising functions of determining whether at least one message of an alert message, a confirm message, and a prompt message occurs in an inserted web page; and processing a popup window, created depending on occurrence of the message, to be displayed in a main window.

According to a cloud streaming service providing method, a device and system for this, and a computer-readable recording medium having, recorded thereon, a cloud streaming script code for this, it is possible to easily process a popup window event or the like incapable of providing a cloud streaming service, without any modification of a browser internal engine, by inserting a predefined script code for cloud streaming into a web page being loaded.

BRIEF DESCRIPTION OF DRAWINGS

FIG. 7 shows an example of a code for supporting a method for providing a cloud streaming service according to an embodiment of the present invention.

FIG. 8 shows an example of a script code for cloud streaming according to an embodiment of the present invention.

DETAILED DESCRIPTION

Figure 1:
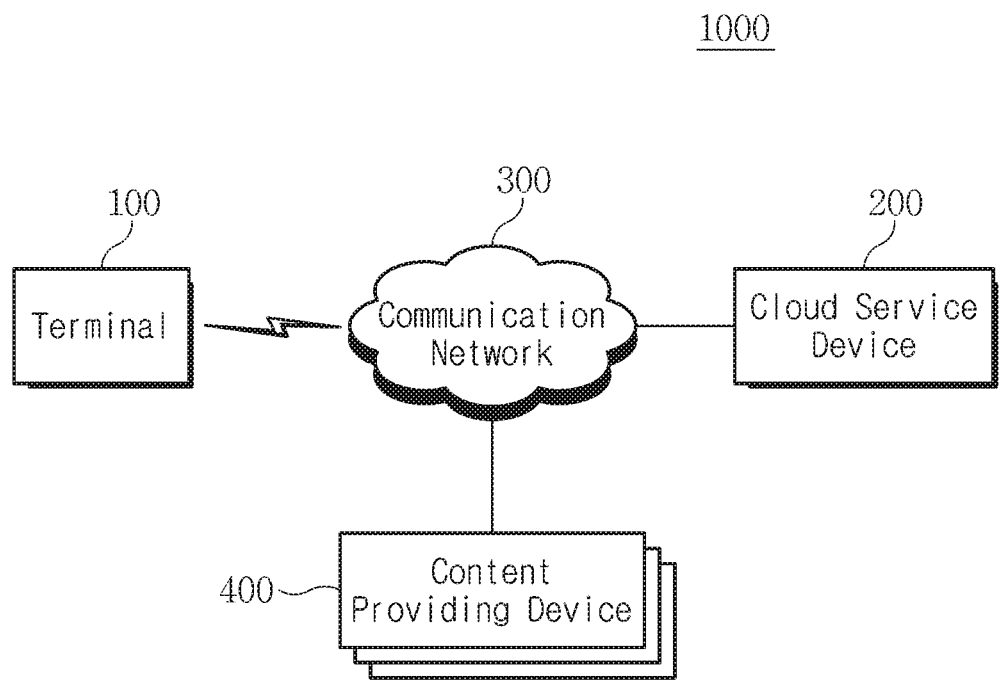
FIG. 1 is a schematic diagram of a cloud service system according to an embodiment of the present invention.

Hereinafter, embodiments of the present invention will be described in detail with reference to the accompanying drawings such that any person skilled in the art can easily use this invention. In the following description, however, well known functions or elements may not be described or illustrated in detail to avoid obscuring the subject matter of the present invention. While this invention will be particularly shown and described with reference to an exemplary embodiment thereof, it will be understood by those skilled in the art that various changes in form and details may be made therein without departing from the scope of the invention.

The terms having ordinal numbers such as first or second will be used to merely distinguish one element from the others and not to be construed as a limitation of such elements. For example, without departing from the scope of this invention, a first element may be referred to as a second element, and similarly the second element may also be referred to as the first element.

When it is stated that a certain element is "coupled to" or "connected to" another element, this means a logical or physical coupling or connection. Also, the element may be directly coupled or connected to another element, or a new element may exist between both elements.

The terms used herein are only used for describing a specific embodiment but are not intended to limit this invention. Singular forms are intended to include plural forms unless the context clearly indicates otherwise. In this disclosure, the terms "include", "comprise" and "have" as well as derivatives thereof mean inclusion, without limitation, of features, numbers, steps, operations, elements, components, or any combination thereof.

Now, a method for providing a cloud streaming service according to an embodiment of the present invention, a device and system for this, and a computer-readable recording medium having, recorded thereon, a cloud streaming script code for this will be described in detail with reference to the drawings. Through the drawings, the same or similar reference numerals denote corresponding features and operations consistently.

The present invention relates to a cloud streaming service that allows a user to use a service or function regardless of the performance of a terminal through screen virtualization based on a cloud computing environment. In particular, this invention may include a function for converting a web page (or a web application formed of two or more web pages), offered by a content providing device, into a suitable form for a cloud streaming service and then providing it to a terminal.

At the outset, a cloud service system according to an embodiment of the present invention will be described.

FIG. 1 is a schematic diagram of a cloud service system according to an embodiment of the present invention.

Referring to FIG. 1, the cloud service system 1000 according an embodiment of this invention may include a terminal 100, a cloud service device 200, and a communication network 300 that supports transmission and reception of information between the terminal 100 and the cloud service device 200. Further, the cloud service system 1000 may operate through interaction with a plurality of content providing devices 400.

Specifically, the terminal 100 refers to a user's device capable of transmitting and receiving various kinds of data through the communication network 300 in response to user's manipulations. The terminal 100 may perform a voice or data communication through the communication network 300 and also transmit or receive various kinds of information to or from the cloud service device 200. For this, the terminal 100 may have a browser for transmission and reception of information, a memory for storing programs and protocols, a microprocessor for executing, operating and controlling various programs, and the like.

Particularly, the terminal 100 according to an embodiment of this invention may send a request for a certain service or function to one or more of the cloud service device 200 and the content providing device 400, then receive streaming data from the cloud service device 200, and output the received data. The terminal 100 may basically have a function for receiving and decoding encoded streaming data, and also have a function for rendering and outputting decoded video data.

The terminal 100 according to an embodiment of this invention may be realized in various forms. For example, the terminal 100 disclosed herein may use a mobile terminal such as a smart phone, a tablet PC, a personal digital assistants (PDA), a portable multimedia player (PMP) or an MP3 player, or a stationary terminal such as a smart TV or a desktop computer.

The terminal 100 according to an embodiment of this invention may be classified into a device having a display function and another device having no display function. The device having no display function may be connected to an image output device (not shown) such as a TV, a monitor, or a projector, and then transmit data to the image output device, thus outputting a service screen through the image output device.

According to a recent trend of convergence in digital devices, a great variety of mobile devices or their equivalences may be used as the terminal 100 of the present invention. Also, any device capable of receiving streaming data from the cloud service device 200 through the communication network 300 may be applied as the terminal 100 of this invention.

The cloud service device 200, which is an element for providing a cloud streaming service of this invention, performs a role of providing a service or function, requested by the terminal 100, to the terminal 100 through a screen virtualization function. Herein, the screen virtualization refers to realizing an execution screen of a specific application at a server, i.e., the cloud service device 200, connected through the network 300, as if being executed at the terminal 100, and then providing it to the terminal 100. For this, the cloud service device 200 executes its own resources, e.g., various applications such as a user interface (UI) application or a game application, creates a capture image by capturing an execution screen, encodes the capture image, and then transmits the encoded image to the terminal 100 in a streaming manner. At this time, the cloud service device 200 operates an application in response to a user input received from the terminal 100 and then transmits a changed execution screen to the terminal 100 in a streaming manner, so that a user of the terminal 100 can be provided with a user experience as if the terminal 100 directly executes the application.

Main elements and operating method of the cloud service device 200 will be described below in detail. A processor equipped in the cloud service device 200 according to an embodiment of this invention may process program commands for performing a method according to this invention. This processor may be a single-threaded processor in one embodiment and a multi-threaded processor in another embodiment. Also, this processor may process commands stored in a memory or in a storage unit.

Additionally, the content providing device 400, which is a device for providing content separately from the cloud service device 200, may perform a role of providing, e.g., a requested web page to the terminal 100 through the cloud service device 200. Also, the content providing device 400 may previously provide a web application, i.e., a collection of web pages, to the cloud service device 200. And also, the content providing device 400 may provide content formed of a video, such as real-time broadcast or VOD, or a web page containing such content to the terminal 100 while interacting with the cloud service device 200. The content providing device 400 may be operated by any entity (a service provider) other than the cloud service device 200. Specifically, the content providing device 400 may be a QAM transmitter of a cable TV or an IPTV head-end system.

Additionally, the communication network 300 is an element for delivering data through connections between the terminal 100 and the cloud service device 200, between the cloud service device 200 and the content providing device 400, and between the terminal 100 and the content providing device 400, and also may be realized with various types of communication network.

For example, wireless communication types such as wireless LAN (WLAN), Wi-Fi, Wibro, Wimax, high speed downlink packet access (HSDPA), and the like, or wired communication types such as Ethernet, xDSL (ADSL or VDSL), hybrid fiber coaxial cable (HFC), fiber to the curb (FTTC), fiber to the home (FTTH), and the like may be used. In addition to the above-discussed communication types, any other communication technique well known in the art or to be developed may be used.

Respective connections between the terminal 100 and the cloud service device 200, between the terminal 100 and the content providing device 400, and between the cloud service device 200 and the content providing device 400 may be based on different communication media or types. For example, a public communication network may be used for connections between the terminal 100 and the cloud service device 200 and between the terminal 100 and the content providing device 400, whereas a dedicated communication network may be used for connection between the content providing device 400 and the cloud service device 300.

Through interactions between the terminal 100, the cloud streaming device 200, and the content providing device 400, this invention may integrate content data, provided from the content providing device 400, with content data, provided from the cloud service device 200, and then provide the integrated contents to the terminal 100. This integration of contents may be, for example, the integration between a video image of a real-time broadcast or VOD provided by the content providing device 400 and a user interface application provided for user manipulations by the cloud streaming device 200. The above is, however, exemplary only and any other integration between various kinds of contents may be possible according to the cloud streaming service of the present invention.

Hereinafter, for the convenience of description, the content providing device 400 will be described focusing on elements for providing a web page to the terminal 100 through the cloud service device 200.

Now, main elements and operating method of the terminal 100 according to an embodiment of the present invention will be described.

Figure 2:
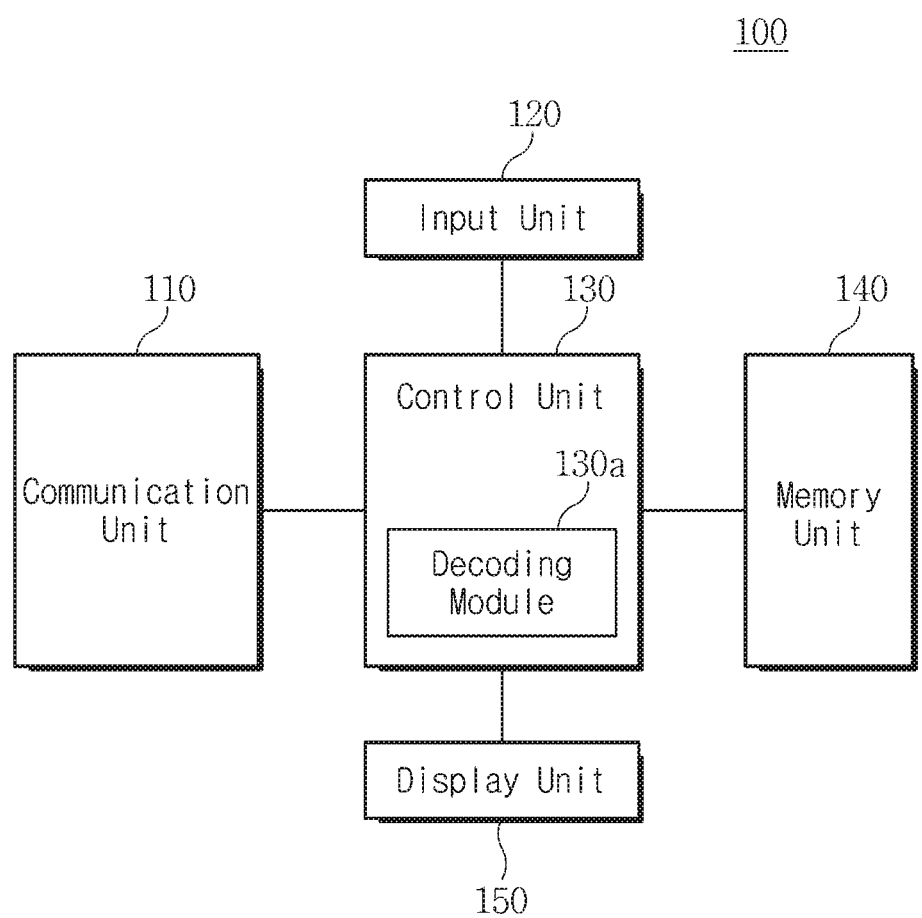
FIG. 2 is a block diagram illustrating main elements of a terminal shown in FIG. 1 according to an embodiment of the present invention.

FIG. 2 is a block diagram illustrating a main configuration of a terminal shown in FIG. 1 according to an embodiment of the present invention.

Referring to FIGS. 1 and 2, the terminal 100 may include a communication unit 110, an input unit 120, a control unit 130, a memory unit 140, and a display unit 150.

The communication unit 110 is configured to access one or more of the cloud service device 200 and the content providing device 300 through the communication network 400 and to transmit and receive data associated with the cloud streaming service. Specifically, the communication unit 110 may transmit a request for a web page to the cloud service device 200 and then receive a captured and encoded image corresponding to the requested web page from the cloud service device 200 in a streaming manner.

The communication unit 110 may be implemented in various types of communication module so as to transmit and receive data in accordance with the type of the communication network 400 accessed by the terminal 100. For example, the communication unit 110 may include one or more different communication modules such as a mobile communication module for transmitting and receiving data through a mobile communication network such as WCDMA, LTE, LTE-A, or the like, a wired communication module for transmitting and receiving data through a wired communication network such as TCP/IP-based wired internet, a wireless communication module for transmitting and receiving data through the communication network 400 by means of wireless communication technique such as Wi-Fi, and a short range communication module for transmitting and receiving data by means of short range communication technique such as Bluetooth or near field communication (NFC).

Having one or more these communication modules, the communication unit 110 may transmit and receive data to and from the cloud service device 200 and the content providing device 300 through different paths.

The input unit 120, which is configured to receive various kinds of information such as numerical and literal information from a user, creates an input signal for setting and controlling various functions of the terminal 100 in response to user manipulations and then delivers the created signal to the control unit 130. Particularly, the input unit 120 allows a user to request the cloud streaming service.

The input unit 120 may include one or more of a key input mechanism such as a keyboard or a keypad, a touch input mechanism such as a touch sensor or a touch pad, a gesture input mechanism having a gyro sensor, a geomagnetic sensor, an accelerator sensor, a proximity sensor, and/or a camera, and a voice input mechanism. The input unit 120 may include all kinds of input mechanisms well known, being developed, or to be developed. If being formed of a touch screen, the input device 120 may simultaneously perform an input function and a display function.

The control unit 130 is configured to generally control the operation of the terminal 100 according to this invention. Basically, the control unit 130 controls the supply of power to respective elements of the terminal 100 and also controls the operation of functions of such elements. The control unit 130 may be implemented in a combination of an operating system (OS) and a processor, e.g., a central processing unit (CPU), for operating respective elements. Namely, when the terminal 100 is turned on, the control unit 130 may construct the OS for executing various application programs by loading and executing an OS program, and then, based on the OS, execute one or more application programs or control the functions of the application programs.

Particularly, the control unit 130 of the terminal according to this invention accesses one or more of the cloud service device 200 and the content providing device 300 through the communication unit 110 in response to a user's request associated with the cloud streaming service, and then requests a service. For example, the control unit 130 may request the cloud service device 200 to offer a web page provided by the content providing device 400, and also support a procedure of decoding and outputting data provided from the cloud service device 200. Also, in case of being connected with any separate image output device (not shown), the control unit 130 may support a procedure of delivering decoded data to the image output device (not shown).

In order to perform the above procedure, the control unit 130 may include a decoding module 130a. Additionally, the control unit 130 may further include a mixing module (not shown) for streaming data integration, a rendering module (not shown) for data output, and/or the like.

The memory unit 140 is configured to store programs and data required for the operation of the terminal 100 according to an embodiment of this invention. Specifically, the memory unit 140 may store the OS program and one or more application programs to be loaded and executed by the control unit 130, and further store data created or to be used by the one or more application programs. The memory unit 140 may include a storage medium such as a flash memory, a hard disk, a multimedia card micro type memory (e.g., SD or XD memory, etc.), RAM, ROM, and/or the like.

The display unit 150 is configured to display information about states and results of operations occurring while the terminal 100 performs a function. Particularly, the display unit 150 may display integrated contents of two contents under the control of the control unit 130. The display unit 150 may be implemented in a liquid crystal display (LCD), a thin film transistor LCD (TFT-LCD), an organic LED (OLED), a light emitting diodes (LED), an active matrix OLED (AMOLED), a flexible display, a 3-dimensional display, and/or the like.

Hereinbefore, the main elements of the terminal 100 have been described with reference to FIG. 2. However, the elements shown in FIG. 2 are not always essential, and more or less elements may be used to implement the terminal 100. For example, the terminal 100 may further include a sound output unit (not shown) for converting an electrical sound signal into an analog signal and then outputting it. Also, the terminal 100 may further include a connection interface unit (not shown) for connecting with any external device and then delivering a signal. This connection interface unit (not shown) may be connected with an image output device (not shown) such as a TV, a monitor, or a projector to output audio, video and control signals. Thus, the connection interface unit (not shown) may be various types of AV interfaces including a high-definition multimedia interface (HDMI).

Also, the terminal 100 may selectively include the connection interface unit or the display unit 150. For example, in case of being implemented in a set-top box, the terminal 100 may include the connection interface (not shown) instead of the display unit 150. Also, if the terminal 100 is implemented in a smart phone or a table PC, the display unit 150 may be included instead of the connection interface unit (not shown).

Meanwhile, the arrangement of the main elements of the terminal 100 shown in FIG. 2 may be varied for convenience or any other reason.

Hereinafter, main elements and operating method of the cloud service device 200 will be described.

Figure 3:
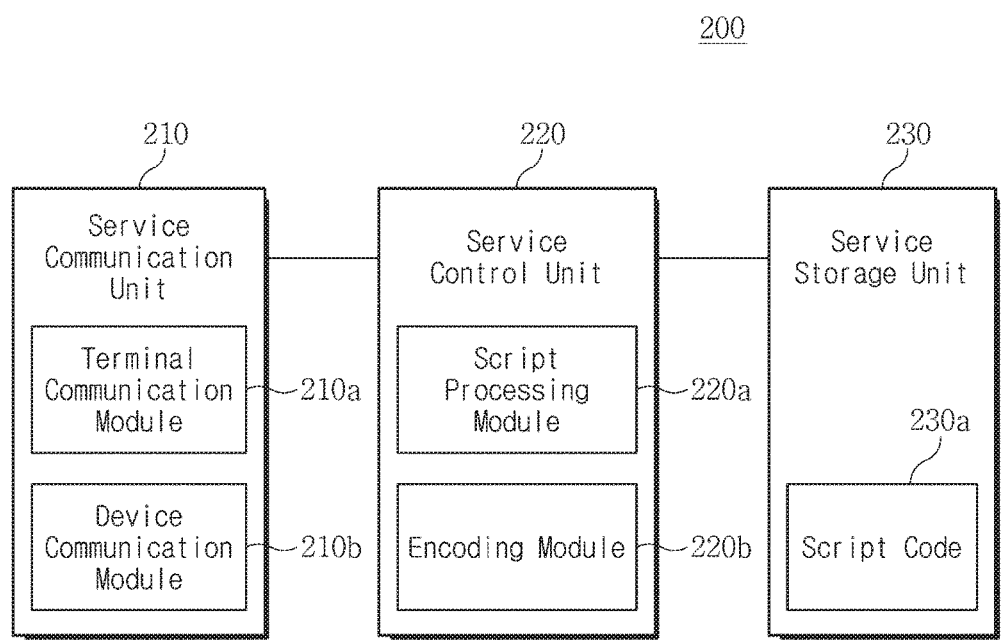
FIG. 3 is a block diagram illustrating main elements of a cloud service device shown in FIG. 1 according to an embodiment of the present invention.
Figure 4:
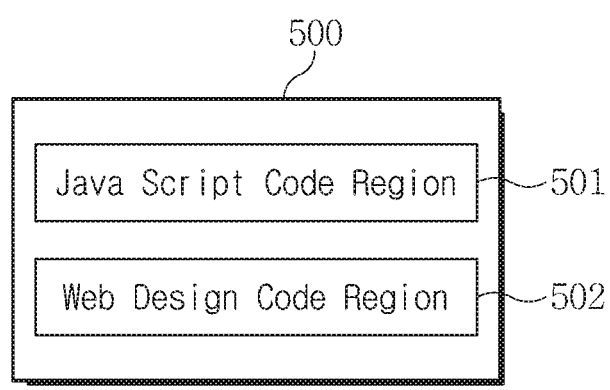
FIG. 4 is a block diagram illustrating a source file structure of a web page according to an embodiment of the present invention.

FIG. 3 is a block diagram illustrating main elements of a cloud service device shown in FIG. 1 according to an embodiment of the present invention, and FIG. 4 is a block diagram illustrating a source file structure of a web page according to an embodiment of the present invention.

First, referring to FIGS. 1 and 3, the cloud service device 200 according to an embodiment of this invention may include a service communication unit 210, a service control unit 220, and a service storage unit 230.

Specifically, the service communication unit 210 may be configured to transmit and receive information to and from one or more terminals 100 and the content providing device 400. For this, the service communication unit 210 may include a terminal communication module 210a and a device communication module 210b. The terminal communication module 210a supports transmission and reception of information with the terminal 100, and the device communication module 210b supports transmission and reception of information with the content providing device 400.

The service control unit 220, which is configured to perform a general control of the cloud service device 200, receives a request for a web page, provided by the content providing device 400, from the terminal 100 through the service communication unit 210. Also, the service control unit 220 may send the request for a web page to the content providing device 400 through the service communication unit 210. Then, if the requested web page is received from the content providing device 400 through the service communication unit 210, the service control unit 220 supports a procedure of capturing a resultant screen of the received web page, creating a capture image, encoding the capture image, and providing the encoded image to the terminal 100.

However, if such a web page is not defined for the cloud streaming service, and if there is a popup window activation event or the like, it is difficult to normally provide a cloud streaming service. In order to solve this problem, the service control unit 220 inserts a predefined script code for cloud streaming into a web page provided from the content providing device 400, executes the web page containing the script code, creates a capture image by capturing a screen resulting from execution, encodes the capture image, and provides the encoded image to the terminal 100 through the service communication unit 210.

According to an embodiment of this invention, a web page may refer to one page, and a web application may refer to a collection of several web pages. Such a web page may be implemented using a web code such as a markup language, a style sheet, and a scripting language. Among them, the style sheet and the scripting language may be selectively omitted. The markup language may be a hypertext markup language (HTML), an extensible hypertext markup language (XHTML), an extensible markup language (XML), or the like. Such a markup language is formed of several tags, attributes of respective tags, and general text. The style sheet is a language for describing user-defined design attributes, i.e., a style, and hence describes a style such as font, size, color, layout, etc. of a page represented by a tag, an attribute and a text. A page using such a style sheet may be seen equally in accordance with the description of the style sheet regardless of display devices having different screen resolutions and regardless of different kinds of browsers. This style sheet may be, for example, cascading style sheet (SCC). A scripting language is a programming language for dynamically controlling a web application. A typical scripting language is Java Script. Also, a web page may contain a resource file. This resource file may be inserted into a web page by using a link tag through a programming language for describing a source file. This resource file may be desirably stored in the content providing device 400 or a certain device on the web. An address (URL) for access to the resource file may be described using the above-mentioned markup language. Such resource files may be a scene description file, a video file, an audio file, an image file, a font file, a text file, a metadata file, a script file, and the like. In addition, various types of resource files may exist, and various formats may be applied to such files.

Furthermore, as shown in FIG. 4, a source file region 500 of a web page may include a Java script code region 501 and a web design code region 502. Although being mixed actually, the Java script code region 501 and the web design code region 502 are distinguished from each other for convenience. By defining Java script functions in the Java script code region 501, calling and applying these functions in the web design code region 502, a web page having dynamical elements can be implemented.

The service control unit 220 of this invention finds the Java script code region in a web page provided from the content providing device 20 and determines whether a predefined script code for cloud streaming is inserted in the found Java script code region. If no script code is inserted, the service control unit 220 identifies a location of a script code to be inserted and then inserts the script code into the identified location.

Additionally, the service control unit 220 executes the script code inserted in the web page when creating a capture image by capturing the web page. According as the script code is executed, the service control unit 220 redefines a designated object in the web page such that a designated message in the web page will be displayed in a main window, and then creates the capture image by capturing the web page.

At this time, the designated message may be at least one of an alert message, a confirm message, and a prompt message. After redefining the designated object, e.g., open method attribute information of a window object or attribute information of a link tag (HTML <a> tag) object, as self, the service control unit 220 may capture the web page so as to create the capture image.

Additionally, the service control unit 220 may include a script processing module 220a and an encoding module 220b. The script processing module 220a may perform a function for inserting a predefined script code for cloud streaming into a web page provided from the content providing device 200.

The encoding module 220b may control the whole procedure of creating the capture image by capturing the execution screen of the web page in which the script code is inserted and executed, of encoding the capture image, and of providing the encoded image to the terminal 100 through the service communication unit 210. At this time, several web pages may be provided to the terminal 100 in a streaming manner.

The service storage unit 230 is configured to store all the programs for executing functions of the cloud service device 200. Particularly, the service storage unit 230 stores various kinds of information associated with services to be provided to the terminal 100. For example, the service storage unit 230 may store and manage a predefined script code 230a for cloud streaming.

The service storage unit 230 of this invention may be a storage residing in the cloud service device 20 or a data storage server located out of the cloud service device 200 and capable of transmission and reception of data with the cloud service device 200.

Hereinbefore, the main elements and operating method of the cloud service device 200 according to an embodiment of this invention have been described.

The cloud service device 200 according to an embodiment of this invention has the same configuration as a typical web server or network server in view of hardware. However, in view of software, the cloud service device 200 includes a program module implemented by means of a language such as C, C++, Java, Visual Basic, Visual C, or the like.

As mentioned above, the cloud service device 200 may be implemented in the form of a web server or a network server. Normally, the web server refers to a computer system, or computer software (web server program) installed therefor, which is connected with many unspecified clients and/or other servers through an open-type computer network such as Internet, receives a task request from such a client or other web server, and provides a task result. However, the web server should be understood as a broader concept including a series of application programs running thereon as well as the above-mentioned web server program and further including, in a certain case, various kinds of database constructed therein. The cloud service device 200 may be implemented using various web server programs offered depending on the OS such as DOS, Windows, Linux, Unix, Macintosh, etc. in hardware for a typical server. Representatively, Website or IIS (Internet Information Server) used in the Windows environment and CERN, NCSA, APPACH, etc. used in the UNIX environment may be used. Also, the cloud service device 200 may store and manage service registration information in membership database, which may be implemented in an inner or output space of the cloud service device 200.

Additionally, the cloud service device 200 according to an embodiment of this invention may be implemented in the form of a distributed computing system which independently provides a virtual machine (VM) to each individual user on the same hardware platform to which one super computer or several computers are connected as if a single computer runs.

Meanwhile, a memory or storage equipped in the terminal 100 or the cloud service device 200 stores information therein. In embodiments, the memory or storage is a computer-readable medium. The memory or storage may be a volatile memory unit in one embodiment and may be a nonvolatile memory unit in another embodiment. In various embodiments, the memory or storage may include, for example, a hard disk device, an optical disk device, or any other high-volume storage device.

In addition, the term "module" used herein may refer to a component or device which is formed of software, hardware, or combination thereof, and performs certain tasks. A module may include, for example, components, such as software components, object-oriented software components, class components and task components, processes, functions, attributes, procedures, subroutines, segments of program code, drivers, data, databases, data structures, tables, arrays, and variables. The functionality provided for in the components and modules may be combined into fewer components and modules or further separated into additional components and modules.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to this invention or allow execution thereby. A computer-readable medium may be a machine-readable storage device, a machine-readable storage board, a memory device, a machine-readable composition of material affecting wave-type signaling, or a combination thereof.

Hereinafter, a method for providing a cloud streaming service according to an embodiment of this invention will be described.

Figure 5:
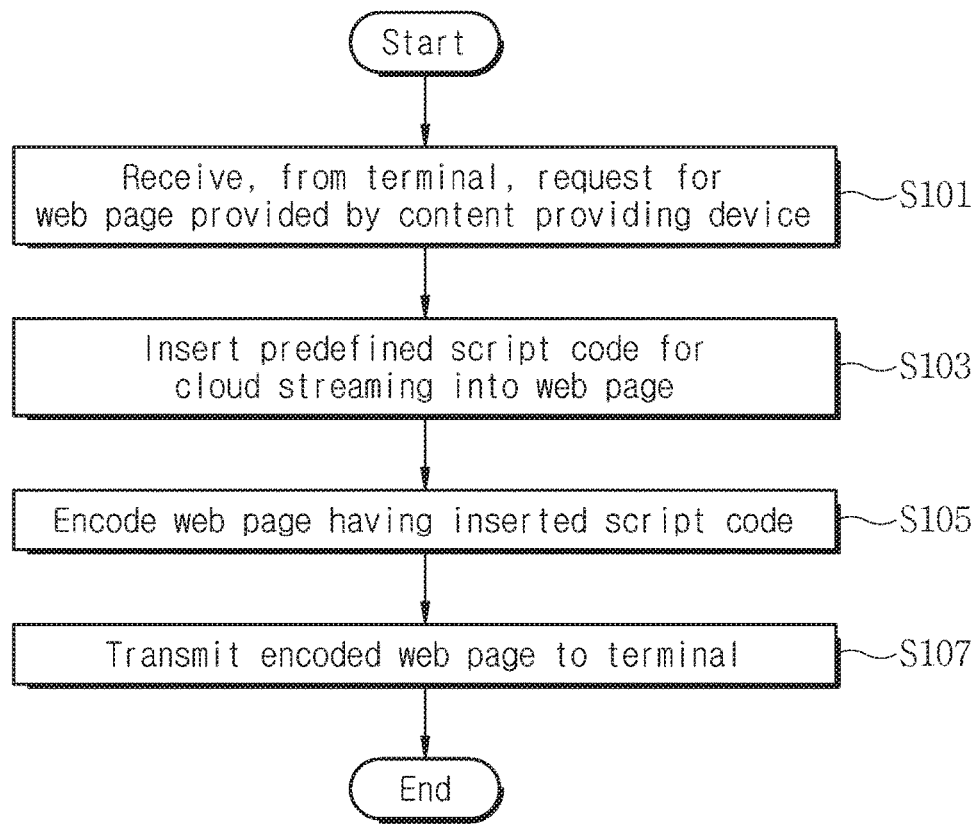
FIG. 5 is a flow diagram illustrating a method for providing a cloud streaming service according to an embodiment of the present invention.

FIG. 5 is a flow diagram illustrating a method for providing a cloud streaming service according to an embodiment of the present invention.

Referring to FIGS. 1 and 5, in this method, the cloud service device 200 receives, from the terminal 100, a request for a web page provided by the content providing device 400 (S101).

Then a predefined script code for cloud streaming is inserted into the provided web page (S103).

Thereafter, the cloud service device 200 completes loading by executing the web page with the script code inserted, creates a capture image by capturing an execution screen of the web page, and encodes the created capture image (S105). Then the cloud service device 200 provides the encoded image to the terminal 100 (S107).

Hereinafter, a method for providing a cloud streaming service according to an embodiment of this invention will be described in detail.

Figure 6:
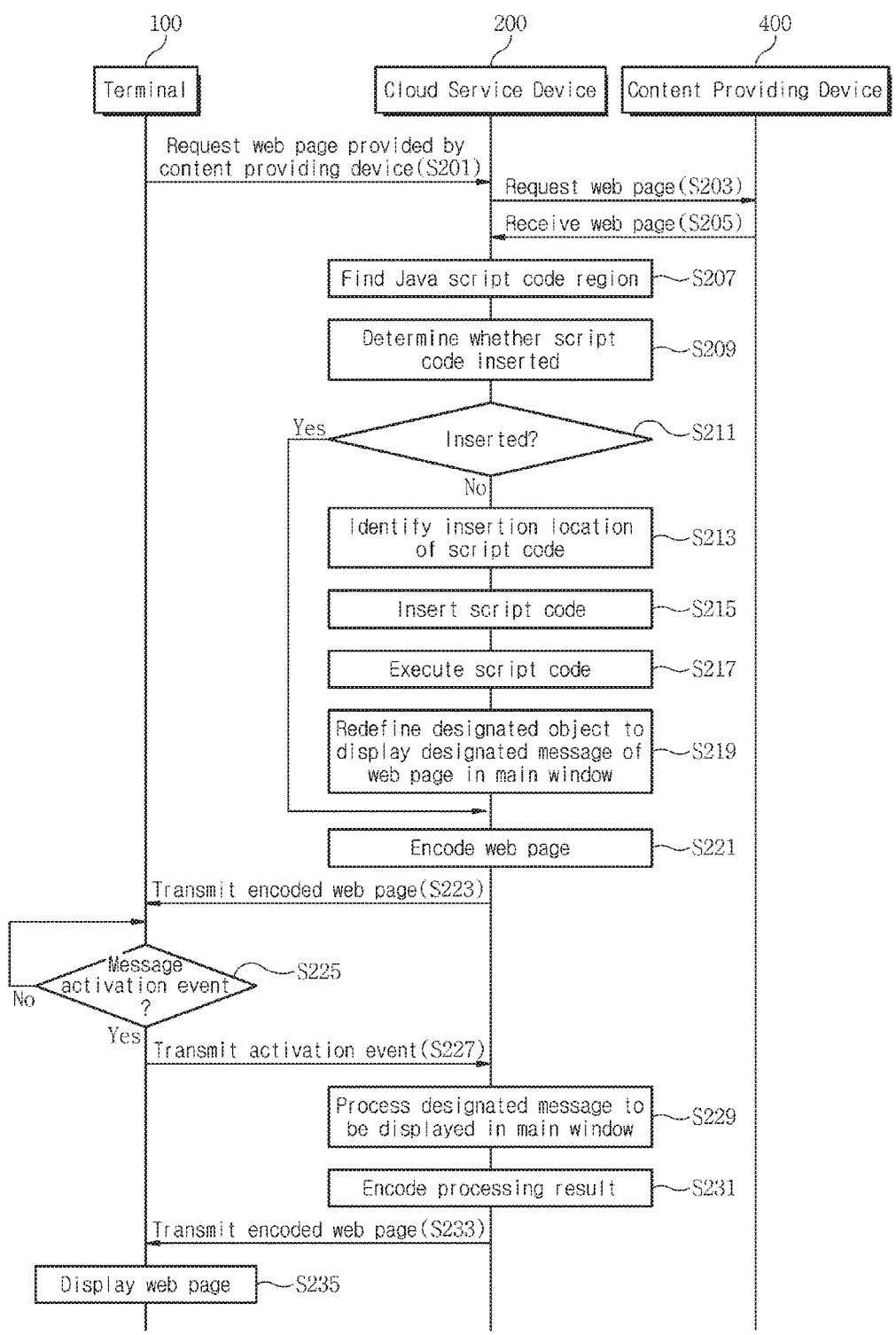
FIG. 6 is a data flow diagram illustrating in detail a method for providing a cloud streaming service according to an embodiment of the present invention.

FIG. 6 is a data flow diagram illustrating in detail a method for providing a cloud streaming service according to an embodiment of the present invention, FIG. 7 shows an example of a code for supporting a method for providing a cloud streaming service according to an embodiment of the present invention, and FIG. 8 shows an example of a script code for cloud streaming according to an embodiment of the present invention.

First, referring to FIG. 6, in this method, the terminal 100 requests the cloud service device 200 to provide a web page offered by the content providing device 400 (S201).

Although it is described in this embodiment that the above step is performed interacting with the cloud service device 200, this is exemplary only and construed as a limitation. Alternatively, in a state where the cloud service device 200 and the content providing device 400 agree with each other in advance, the cloud service device 200 may monitor and detect a request of the terminal 100 provided to the content providing device 400.

Thereafter, the cloud service device 200 may send a request for the web page to the content providing device 400 (S203), and receive the requested web page (S205).

Herein, a process in which the cloud service device 200 receives the web page from the content providing device 400 refers to a loading process. While the web page is loaded, the cloud service device 200 finds a Java script code region in the web page (S207), and determines whether a predefined script code for cloud streaming is inserted in the region (S207). If it is determined that no script code is inserted (S211), the cloud service device 200 identifies an insertion location of a script code and inserts the predefined script code for cloud streaming (S215).

Thereafter, the cloud service device 200 executes the inserted script code (S219).

The above-discussed process as well may be inserted, in the form of code, into the web page provided from the content providing device 400. An example of a code with regard to a process of checking whether the script code is inserted, a process of identifying the insertion location of the script code, and a process of executing the script code is shown in FIG. 7.

Additionally, a code example shown in FIG. 8 refers to a predefined script code for cloud streaming. When this script code is inserted in the web page and then executed, the web page may perform a process of redefining a designated object such that a designated message will be displayed in a main window simultaneously with loading (S219).

Herein, the designated message may be one of an alert message, a confirm message, and a prompt message. The designated object is controlled to be displayed in the main window without activation of a popup window caused by the designated message. For example, as shown in FIG. 8, an open method attribute of a window object is controlled to be redefined as self, or an <a> tag attribute of HTML is controlled to be redefined as self.

When the loading is completed, the cloud service device 200 creates a capture image by capturing an execution screen of the web page, encodes the capture image (S221), and transmits the encoded web page to the terminal 100 (S223).

Then the terminal 100 may decode and output the encoded web page. If an event for activating the designated message occurs in the web page (S225), namely, if an input event of a button for activating an alert message popup window occurs, the terminal 100 transmits this event to the cloud service device 200. Then the cloud service device 200 enables a processing result of the input event to be displayed in the main window, namely, an alert message popup window to be displayed in the main window rather than in the form of a popup window (S229), creates a capture image by capturing a screen of the processing result, encodes the capture image (S231), and provides the encoded image to the terminal 100 (S233). Then the terminal 100 outputs the provided web page (S235).

The above-discussed process may be performed in real time, and the encoded web page may be provided in real time, namely, in a streaming manner from the cloud service device 200 to the terminal 100.

Hereinbefore, the method for providing a cloud streaming service according to embodiments of this invention has been fully described.

The above-discussed cloud streaming service providing method may be recorded in the non-transitory computer-readable storage medium which includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit. Program commands may include high-class language codes, which can be executed in a computer by using an interpreter, as well as machine codes made by a compiler. The aforementioned hardware device may be configured to operate as one or more software modules in order to perform the operation of this invention, and vice versa.

While this disclosure contains many specific implementation details, these should not be construed as limitations on the scope of the invention or of what may be claimed, but rather as descriptions of features that may be specific to particular embodiments of particular invention. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

The present invention relates to a method for providing a cloud streaming service to process a web page to be adapted for the cloud streaming service by inserting a predefined script code for cloud streaming into the web page to be loaded, a device and system for the method, and a computer-readable recording medium having, recorded thereon, a cloud streaming script code for the method. According to this invention, it is possible to easily process a popup window event or the like incapable of providing a cloud streaming service, without any modification of a browser internal engine, by inserting a predefined script code for cloud streaming into a web page being loaded. Also, this invention has a good possibility of sales on the market or business and also has industrial applicability suitable for practical and apparent implementation.

What is claimed is:

1. A cloud service device comprising:
   a memory configured to store a predefined script code for cloud streaming; and
   a processor configured to:
      receive a request for a web page that is not defined for the cloud streaming from a terminal,
      find a Java script code region in the web page,
      determine whether the predefined script code for cloud streaming is inserted to the Java script code region,
      identify an insertion location of the predefined script code,
      insert the predefined script code into the insertion location when the predefined script code is determined not to be inserted to the Java script code region,
      execute the predefined script code inserted in the web page,
      redefine a designated object in the web page,
      display a designated message of the web page on a main window,
      create a capture image by capturing the web page having the inserted predefined script code,
      encode the capture image,
      transmit the encoded capture image to the terminal,
      receive a message for activating the designated message from the terminal,
      display the designated message on the main window based on the redefined designated object when the message is received, and
      provide a processing result to the terminal,
   wherein, when the predefined script code is determined to be inserted to the Java script code region, the processor is configured to encode the capture image.

2. The cloud service device of claim 1, wherein the designated message is at least one of an alert message, a confirm message, and a prompt message.

3. The cloud service device of claim 1, wherein the processor is further configured, when the predefined script code is executed, to redefine open method attribute information of a window object or attribute information of a link tag object, as self, in the web page.

4. The cloud service device of claim 1, wherein the processor is further configured to redefine the designated object in the web page such that the designated message of the web page is inserted to a corresponding location of the main window.

5. A method for providing a cloud streaming service, the method comprising:
   receiving, with a cloud service device, from a terminal, a request for a web page that is not defined for the cloud streaming service provided by a content providing device;
   finding, with the cloud service device, a Java script code region in the web page;
   determining, with the cloud service device, whether a predefined script code for cloud streaming is inserted to the Java script code region;
   identifying, with the cloud service device, an insertion location of the predefined script code in the Java script code region when the predefined script code is determined not to be inserted to the Java script code region;
   inserting, with the cloud service device, the predefined script code for cloud streaming into the identified insertion location on the web page provided from the content providing device;
   executing, with the cloud service device, the script code inserted in the web page;
   redefining, with the cloud service device, a designated object in the web page;
   displaying, with the cloud service device, a designated message of the web page on a main window;
   creating, with the cloud service device, a capture image by capturing the web page having the inserted predefined script code;
   encoding, with the cloud service device, the capture image;
   transmitting, with the cloud service device, the encoded capture image to the terminal;
   receiving, with the cloud service device, a message for activating the designated message from the terminal;
   displaying, with the cloud service device, the designated message on the main window based on the redefined designated object when the message is received; and
   providing, with the cloud service device, a processing result to the terminal,
   wherein, when the predefined script code is determined to be inserted to the Java script code region, encoding the capture image.

6. The method of claim 5, further comprising:
   after the step of receiving the request for the web page, at the cloud service device, receiving the web page by accessing the content providing device.

7. The method of claim 5, wherein redefining the designated object in the webpage comprises:
   redefining, with the cloud service device, open method attribute information of a window object or attribute information of a link tag object, as self, in the web page.

* * * * *